US012726526B1

(12) United States Patent
Raziel et al.

(10) Patent No.: US 12,726,526 B1
(45) Date of Patent: Sep. 1, 2026

(54) AGGREGATING MULTIPLE DATA FINDINGS PER DATA OBJECT IN DATA SECURITY POSTURE MANAGEMENT ENVIRONMENTS

(71) Applicant: Wiz, Inc., New York, NY (US)

(72) Inventors: Alma Raziel, Tel Aviv-Jaffa (IL); Elad Gabay, Tel Aviv (IL); Liron Levin, Kfar Saba (IL); Ofir Sonsino, Tel Aviv (IL); George Pisha, Giv'atayim (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/562,309

(22) Filed: Mar. 10, 2026

(51) Int. Cl.
*H04L 9/40* (2022.01)

(52) U.S. Cl.
CPC .......... *H04L 63/20* (2013.01); *H04L 63/1433* (2013.01)

(58) Field of Classification Search
CPC ............................ H04L 63/20; H04L 63/1433
See application file for complete search history.

(56) References Cited

U.S. PATENT DOCUMENTS 10,257,219 B1 * 4/2019 Geil .................... H04L 63/1408
11,876,813 B2 1/2024 Ithal et al.
2023/0106071 A1 * 4/2023 Kleymenov ........ H04L 63/1441 726/23
2025/0013742 A1 * 1/2025 Castrejon, III ....... G06F 21/554
2025/0202926 A1 6/2025 Chandrabose et al.
2025/0247414 A1 * 7/2025 Baragaba ............ H04L 63/1433
2025/0307428 A1 * 10/2025 Khare .................. G06F 21/577
2026/0113352 A1 * 4/2026 Ganesan ............. H04L 63/1441
2026/0147891 A1 * 5/2026 Lande .................. G06F 21/566

FOREIGN PATENT DOCUMENTS

CN 120104624 A 6/2025

* cited by examiner

*Primary Examiner* — Beemnet W Dada
(74) *Attorney, Agent, or Firm* — M&B IP Analysts, LLC

(57) ABSTRACT

A system and method for applying compounded cybersecurity controls in a data security posture management (DSPM) system based on data findings associated with an individual data object in a cloud computing environment are presented. The method includes detecting data objects in data sources of the cloud computing environment, wherein the data objects include a first data object; obtaining metadata for the data object without accessing payload content; generating a first data finding for the data object; associating the first data finding with an object identifier of the data object; obtaining a sample of the payload content from the data object; generating a second data finding for the data object; associating the second data finding with the object identifier; aggregating the first data finding and the second data finding; determining a compounded sensitivity output; determining a compounded cybersecurity control decision; and initiating a remediation action in the cloud computing environment.

19 Claims, 6 Drawing Sheets

AGGREGATING MULTIPLE DATA FINDINGS PER DATA OBJECT IN DATA SECURITY POSTURE MANAGEMENT ENVIRONMENTS

TECHNICAL FIELD

This disclosure relates, generally, to the field of computing, particularly, to computer security and cloud computing, and more particularly, to generating and presenting multiple data findings associated with individual data objects in data security posture management (DSPM) environments, including aggregating findings into file-level finding sets and applying compounded cybersecurity controls based on combinations of findings.

BACKGROUND

Data security posture management (DSPM) systems are increasingly used to discover, classify, and govern data stored across cloud computing environments. Such environments commonly include heterogeneous data sources, such as object storage buckets, databases, backup repositories, log stores, and other managed services distributed across multiple accounts, regions, and cloud service providers. Effective DSPM typically depends on identifying data objects of interest and applying appropriate controls, policies, and remediation actions.

Many existing DSPM implementations generate findings at a coarse granularity, such as at a resource level (e.g., bucket, database, prefix level), which can obscure the characteristics of individual files or objects within the resource. In particular, when multiple sensitive data types are present within a single file, resource-level findings may fail to clearly indicate the co-occurrence of sensitive data types within the same file and may make it difficult to assess compounded sensitivity arising from such combinations.

Additionally, conventional approaches that rely on payload inspection, pattern matching, or content scanning to detect sensitive data may require access to sensitive payload content, which can be undesirable from a security, privacy, or compliance perspective. Even when content scanning is available, the resulting signals may be surfaced in a manner that does not support efficient correlation of multiple detected sensitive data types to the same file, analysis of combinations of sensitive data types within the file, or selection of controls conditioned on such combinations.

Thus, there exists a need for an implementation of improved techniques for associating and presenting multiple DSPM findings at an individual file or data object level, including aggregating multiple findings into a file-level finding set and enabling application of compounded cybersecurity controls based on combinations of findings within a single file or data object.

Therefore, it would be advantageous to provide an efficient solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key nor critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having hardware, firmware, firmware executing on hardware, software, executing on hardware, or any combination of them installed on the system that, in operation, cause or causes the system to perform the actions. One or more computer programs can be configured to perform particular operations or actions by virtue of including instructions that, when executed by a data processing apparatus, cause the apparatus to perform the actions.

In one general aspect, the method may include detecting a plurality of data objects in one or more data sources of the cloud computing environment, where the plurality of data objects includes a first data object. The method may also include obtaining metadata for the first data object via one or more provider interfaces without accessing payload content of the first data object; generating a first data finding for the first data object based on the obtained metadata; associating the first data finding with an object identifier of the first data object; obtaining a sample of the payload content from the first data object when permitted; generating a second data finding for the first data object based on analysis of the obtained sample of payload content; associating the second data finding with the object identifier of the first data object; aggregating the first data finding and the second data finding into a file-level finding set for the first data object based on the object identifier; determining a compounded sensitivity output based on a combination of the first data finding and the second data finding within the file-level finding set; determining a compounded cybersecurity control decision based on the compounded sensitivity output and at least one of control policies and mappings; initiating a remediation action in the cloud computing environment based on the compounded cybersecurity control decision. Other embodiments of this aspect include corresponding computer systems, apparatus, and computer programs recorded on one or more computer storage devices, each configured to perform the actions of the methods.

Implementations may include one or more of the following features. The method may include determining a combination indicator indicating co-occurrence of at least two sensitive data types within the file-level finding set.

The method where obtaining metadata further may include: extracting the metadata from the one or more provider interfaces without reading file contents or other payload content of the first data object. The method may include selecting the first data object for obtaining the sample of payload content based on at least one of the first data finding, a confidence value associated with the first data finding, and a policy constraint.

The method where obtaining the sample of payload content further may include: obtaining less than all payload content of the first data object by reading at least one of a bounded number of bytes, a bounded number of records, and a bounded number of lines.

The method where aggregating the first data finding and the second data finding into the file-level finding set further may include: generating, for the first data object, a plurality of detected sensitive data types and a respective count for each sensitive data type.

The method where determining the compounded sensitivity output further may include: applying at least one mapping or threshold to at least one of co-occurrence of at least two sensitive data types in the file-level finding set and counts associated with the at least two sensitive data types.

The method where initiating the remediation action further may include: invoking the one or more provider interfaces to modify at least one of access controls, encryption settings, tags, and storage configuration associated with the first data object or a location containing the first data object. The method may include storing, in a security database, at least one of the file-level finding set, the compounded sensitivity output, and the compounded cybersecurity control decision; and generating a serialized export of at least one of the stored file-level finding set, compounded sensitivity output, and compounded cybersecurity control decision. Implementations of the described techniques may include hardware, a method or process, or a computer tangible medium.

In one general aspect, the system may include one or more processors configured to: detect a plurality of data objects in one or more data sources of the cloud computing environment, where the plurality of data objects includes a first data object. The system may furthermore obtain metadata for the first data object via one or more provider interfaces without accessing payload content of the first data object; generate a first data finding for the first data object based on the obtained metadata; associate the first data finding with an object identifier of the first data object; obtain a sample of the payload content from the first data object when permitted; generate a second data finding for the first data object based on analysis of the obtained sample of payload content; associate the second data finding with the object identifier of the first data object; aggregate the first data finding and the second data finding into a file-level finding set for the first data object based on the object identifier; determine a compounded sensitivity output based on a combination of the first data finding and the second data finding within the file-level finding set; determine a compounded cybersecurity control decision based on the compounded sensitivity output and at least one of control policies and mappings; initiate a remediation action in the cloud computing environment based on the compounded cybersecurity control decision. Other embodiments of this aspect include corresponding computer systems, apparatus, and computer programs recorded on one or more computer storage devices, each configured to perform the actions of the methods.

Implementations may include one or more of the following features. The system where the one or more processors are further configured to determine a combination indicator indicating co-occurrence of at least two sensitive data types within the file-level finding set.

The system where one or more processors, when obtaining metadata, are configured to extract the metadata from the one or more provider interfaces without reading file contents or other payload content of the first data object.

The system where one or more processors are further configured to select the first data object for obtaining the sample of payload content based on at least one of the first data finding, a confidence value associated with the first data finding, and a policy constraint.

The system where one or more processors, when obtaining the sample of payload content, are configured to obtain less than all payload content of the first data object by reading at least one of a bounded number of bytes, a bounded number of records, and a bounded number of lines.

The system where one or more processors, when aggregating the first data finding and the second data finding into the file-level finding set, are configured to generate, for the first data object, a plurality of detected sensitive data types and a respective count for each sensitive data type.

The system where one or more processors, when determining the compounded sensitivity output, are configured to apply at least one mapping or threshold to at least one of co-occurrence of at least two sensitive data types in the file-level finding set and counts associated with the at least two sensitive data types.

The system where one or more processors, when initiating the remediation action, are configured to invoke one or more provider interfaces to modify at least one of access controls, encryption settings, tags, and storage configuration associated with the first data object or a location containing the first data object.

The system where one or more processors are further configured to store, in a security database, at least one of the file-level finding set, the compounded sensitivity output, and the compounded cybersecurity control decision; and generate a serialized export of at least one of the stored file-level finding set, compounded sensitivity output, and compounded cybersecurity control decision. Implementations of the described techniques may include hardware, a method or process, or a computer tangible medium.

In one general aspect, non-transitory computer-readable medium may include one or more instructions that, when executed by one or more processors of a device, cause the device to: detect a plurality of data objects in one or more data sources of the cloud computing environment, where the plurality of data objects includes a first data object; obtain metadata for the first data object via one or more provider interfaces without accessing payload content of the first data object; generate a first data finding for the first data object based on the obtained metadata; associate the first data finding with an object identifier of the first data object; obtain a sample of the payload content from the first data object when permitted; generate a second data finding for the first data object based on analysis of the obtained sample of payload content; associate the second data finding with the object identifier of the first data object; aggregate the first data finding and the second data finding into a file-level finding set for the first data object based on the object identifier; determine a compounded sensitivity output based on a combination of the first data finding and the second data finding within the file-level finding set; determine a compounded cybersecurity control decision based on the compounded sensitivity output and at least one of control policies and mappings; and initiate a remediation action in the cloud computing environment based on the compounded cybersecurity control decision. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings. In the drawings:

DETAILED DESCRIPTION

Figure 1:
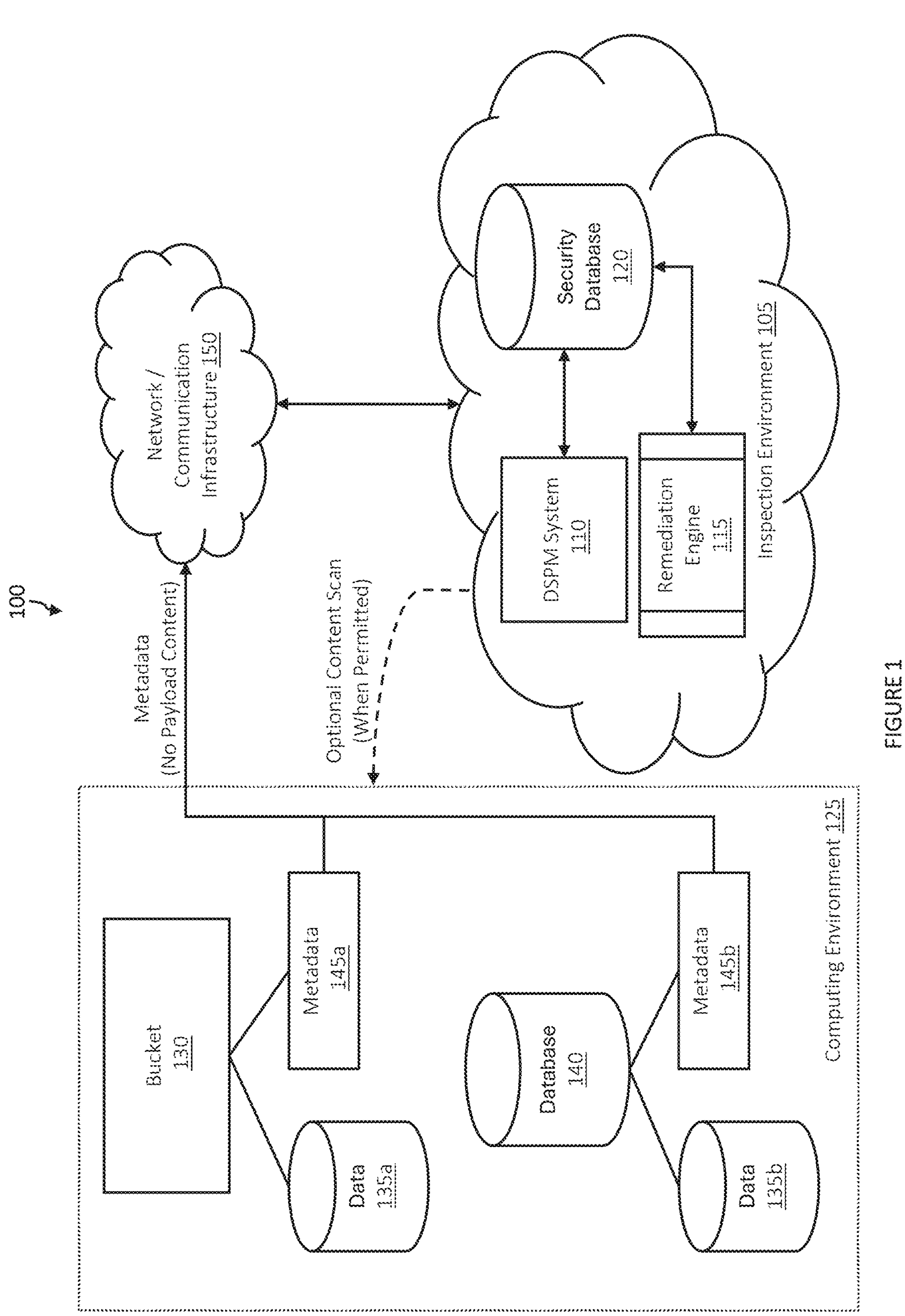
FIG. 1 illustrates an example computing environment utilized to describe various embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

As used herein, the following terms have the meanings set forth below, unless the context clearly indicates otherwise. The definitions provided herein are intended to clarify the disclosed embodiments and do not limit the scope of the invention unless expressly stated. To the extent a term is not expressly defined herein, the term is intended to have its ordinary and customary meaning to a person having ordinary skill in the art (PHOSITA) at the time of filing.

"Data source" refers to a service or system that stores, references, or exposes data objects, including object storage services (e.g., buckets), databases, data lakes, file systems, backup repositories, log stores, virtual machine disks, snapshots, catalogs, and/or similar storage or data management services.

"Data object" refers to any unit of stored or addressable data in a data source, including, without limitation, a file, blob, object, document, table, view, export, snapshot, backup artifact, log artifact, model artifact, configuration artifact, or other stored entity addressable by an identifier.

"Payload content" or "content" refers to the substantive contents of a data object (e.g., file bytes, object body, table cell values) as distinct from metadata. Accessing payload content includes reading, scanning, parsing, or otherwise inspecting the substantive data of the data object.

"Metadata" refers to information associated with a data object that can be obtained without accessing payload content. Metadata may include object identifiers, names, file paths or object keys, hierarchical path segments, directory depth, timestamps, size, storage properties, tags/labels, ownership attributes, access control attributes, encryption indicators, versioning indicators, content-type indicators, checksums/hashes (when available without payload access), and other non-payload properties.

"Object identifier" refers to any identifier usable to reference or locate a data object, including a URI, object key, file path, table identifier, database identifier, bucket/container identifier, resource name, or other canonical reference.

"Hierarchy" or "namespace" refers to a representation of relationships among data objects based on naming structure, location structure, or other organization. For object storage, a hierarchy may be derived from object keys and delimiters (e.g., "/") and represented as a prefix tree or trie. For databases, a hierarchy may be derived from schemas, table namespaces, and/or backup/log naming conventions.

"Hierarchy features" or "path features" refer to features derived from object identifiers and/or hierarchies, including shared prefix length, token overlap of path segments, directory depth, sibling/ancestor relationships, extension patterns, and other path-based indicators.

"Feature extraction" or "normalization" refers to processing performed on metadata to create a consistent representation and/or feature set usable for classification, correlation, and/or aggregation as described herein, including tokenization, parsing, normalization of formats, and derivation of hierarchy/path features.

"Cluster" or "data cluster" or "data grouping" refers to a group of data objects determined to be similar based on metadata-derived features, and is provided for purposes of describing example metadata-based classification techniques that may be used in at least one embodiment.

"Classification result" refers to a classification output associated with a data object and/or a group of data objects produced by applying one or more rules and/or models to metadata-derived features and/or content-derived features.

"Machine learning (ML) model" refers to a model configured to generate an output based on an input, including supervised models, unsupervised models, heuristic models, and language models. An ML model may be trained, fine-tuned, prompted, and/or otherwise configured to produce classifications, attributes, confidence values, or other outputs.

"Language model (LM)" refers to a machine learning model configured to process natural language or token sequences. A language model may be used to generate classifications based on prompts or model inputs derived from metadata and/or aggregated representations. In at least one embodiment, an LM includes (or is) a large language model (LLM).

"Prompt" or "model input" refers to an input to an ML model derived from metadata and/or an aggregated representation, such as a structured prompt, template, token sequence, or other encoded representation.

"Data finding" or "finding" refers to a generated output that associates a classification with one or more data objects, and may include supporting metadata-derived or content-derived evidence, confidence, timestamps (e.g., first seen/last seen), status, and recommended controls or actions.

"Metadata-based data finding" refers to a data finding generated based on metadata associated with a data object without accessing the payload content of the data object.

"Sample-based data finding" refers to a data finding generated based on analysis of a sample of payload content obtained from a data object when permitted.

"File-level finding set" refers to an aggregated set of two or more data findings associated with a same data object, correlated using an object identifier, and including an indication of multiple detected sensitive data types and, in at least one embodiment, counts associated with respective sensitive data types.

"Combination indicator" refers to an indication of the co-occurrence of multiple sensitive data types within a file-level finding set for a data object.

"Compounded sensitivity" refers to an assessment derived from a combination of data findings within a file-level finding set, including a compounded severity tier, compounded sensitivity score, and/or compounded classification indicative of increased sensitivity due to the co-occurrence of multiple sensitive data types within a same data object.

"Compounded cybersecurity control" or "compounded control decision" refers to a control selection decision determined based on compounded sensitivity and conditioned on a combination of data findings within a file-level finding set, and may specify one or more recommended actions and/or executable actions.

"Gating controller" or "candidate subset selection" refers to logic configured to select a subset of data objects for additional processing (e.g., optional content scanning) based on metadata-derived outputs, confidence values, policies, and/or risk indicators.

"Optional content scan" or "optional confirmation" refers to payload-based scanning or inspection performed only when permitted and typically only on a gated candidate subset. Optional content scanning may be used to confirm or refine a metadata-based classification and/or adjust confidence.

"Remediation action" or "control action" refers to an action initiated or recommended based on at least one of a data finding, a file-level finding set, or a compounded control decision, including modifying access controls, applying encryption settings, tagging/labeling objects, quarantining or relocating objects, generating alerts/tickets, and initiating automated workflows.

"Policy mapping" refers to associations between classifications/findings and one or more controls, remediation actions, priority levels, thresholds, or workflow selections.

"Customer environment" refers to a computing environment associated with a customer and including one or more cloud accounts, projects, subscriptions, tenants, regions, networks, resource groups, and/or data sources in which data objects are stored and managed, and in which metadata is obtained and analyzed for generating classifications and data findings.

The method and system generate and present multiple data findings associated with individual data objects in one or more cloud computing environments by obtaining and analyzing metadata associated with the data objects without accessing payload content, thereby reducing exposure to sensitive data while enabling scalable identification of sensitive data types for data security posture management (DSPM). In at least one embodiment, the method and system associate metadata-based findings with object identifiers of respective data objects (e.g., file paths or object keys) to enable aggregation of multiple findings for a same data object.

Moreover, the method and system can generate a file-level finding set for an individual data object by correlating and aggregating multiple data findings associated with the data object, including multiple sensitive data types and corresponding counts, thereby enabling cross-data-type analysis of co-occurrence within a single data object. In at least one embodiment, the method and system determine a combination indicator and a compounded sensitivity output (e.g., compounded severity tier, compounded sensitivity score, or compounded classification) based on a combination of data findings within the file-level finding set.

Also, the method and system can perform hybrid gating that selects a candidate subset of data objects for optional content scanning based on metadata-derived outputs and policy constraints, thereby minimizing payload access while enabling the generation of sample-based findings that confirm or refine metadata-based findings. In at least one embodiment, the method and system apply a compounded cybersecurity control decision based on a combination of findings within a file-level finding set and initiate or recommend remediation actions based on the compounded control decision. In at least one embodiment, the method and system store and present file-level finding sets including representative object identifiers, status, and time-based attributes, such as first-seen and last-seen indicators, and support serialized export (e.g., JSON), thereby enabling actionable reporting, auditing, filtering, and downstream control selection and remediation workflows in DSPM environments.

The disclosed embodiments are operable within a variety of computing architectures and communication environments and are not limited to any particular hardware, software, or network configuration discussed herein. The embodiments may be implemented across heterogeneous environments, including on-premises systems, cloud-based infrastructures, hybrid deployments, edge-based systems, and distributed computing environments, and may operate across multiple cloud providers, accounts, regions, and data source types.

The disclosed method is not a mental process and cannot be performed entirely in the human mind. Rather, the method involves technical operations that are executed within a computing environment and are tied to specific technological implementations. For example, the method includes: (i) detecting data objects in cloud data sources, such as object storage buckets and databases; (ii) obtaining and normalizing metadata associated with the data objects via provider interfaces without accessing payload content; (iii) generating metadata-derived features from the metadata, including hierarchy and path features derived from object keys and file paths; (iv) generating one or more metadata-based data findings for respective data objects and associating the metadata-based data findings with object identifiers; (v) selecting, based on metadata-derived outputs and policy constraints, a candidate subset of data objects for optional content scanning and, when permitted, obtaining a sample of payload content to generate one or more sample-based data findings; (vi) correlating and aggregating multiple data findings associated with a same data object to generate a file-level finding set; (vii) determining a combination indicator and a compounded sensitivity output based on a combination of data findings within the file-level finding set; and (viii) selecting and outputting one or more recommended actions and/or initiating remediation actions based on a compounded cybersecurity control decision derived from the file-level finding set.

The operation and effectiveness of the disclosed system and method depend on a variety of technical factors, including, without limitation, the availability and structure of provider-exposed metadata, heterogeneity of metadata schemas across cloud services, organization of object keys and file paths, scale and churn of cloud inventories, computing resource constraints associated with metadata collection and analysis, policy constraints governing payload access, sampling strategies for optional content scanning, and configuration of control mappings and thresholds for determining compounded sensitivity and selecting compounded controls. The method may dynamically modify gating selection for optional content scanning, aggregation behavior for file-level finding sets, and control selection based on observed metadata distributions, co-occurrence of sensitive data types within individual data objects, and changes in detected findings over time. Such dynamic modification requires automated processing at machine scale and is not practically performable by a human operator without the use of computing systems.

Although a human operator may review findings, configure policies, or tune thresholds, execution of metadata acquisition, feature generation, generation of multiple findings for an individual data object, correlation and aggregation into file-level finding sets, determination of compounded sensitivity based on combinations of findings, optional gated content scanning, and selection or initiation of compounded control actions remains rooted in automated processing performed by computing systems. In particular, at runtime, the operational steps involved in enumerating inventories of data objects, associating findings with object identifiers, aggregating multiple findings for the same data object, evaluating co-occurrence patterns, and selecting controls based on compounded sensitivity are performed autonomously by the system without requiring human intervention at that time.

Accordingly, the disclosed embodiments are directed to a practical application of computer technology to solve a specific technical problem in the field of data security posture management for cloud environments. In particular, the disclosed embodiments improve the ability of DSPM systems to generate and present multiple findings at an individual data object level, enable assessment of compounded sensitivity due to combinations of sensitive data types within a single data object, reduce exposure to sensitive payload content by selectively gating optional content scanning, and improve control selection and remediation workflows through compounded cybersecurity control decisions, all of which are necessarily rooted in computing technology.

FIG. 1 illustrates an example operating environment 100 for detecting and classifying data objects in a cloud computing environment (e.g., computing environment 125) based on metadata, for generating multiple data findings associated with an individual data object, and for initiating remediation actions based on a compounded control decision, utilized to describe the various disclosed embodiments that may be implemented.

The operating environment 100 illustrated in FIG. 1 includes a data security posture management (DSPM) system 110 (hereinafter referred to as "system 110"), a security database 120, and a remediation engine 115, deployed within an inspection environment 105, and one or more data sources deployed within a computing environment 125, such as a bucket 130 and a database 140, communicatively coupled via a network or communication infrastructure 150.

System 110 is configured to discover data objects in one or more computing environments, obtain metadata associated with the data objects, classify data objects and/or groups of data objects based on the metadata, generate data findings, aggregate multiple data findings associated with a same data object into a file-level finding set, and initiate or recommend remediation and/or control actions based on the file-level finding set.

In at least one embodiment, system 110 is further configured to detect a plurality of data objects in computing environment 125 and to obtain metadata associated with the data objects without obtaining payload content of the data objects. For example, bucket 130 may expose metadata 145*a* and database 140 may expose metadata 145*b*, whereby metadata includes one or more object properties, such as object identifiers, names, file paths or object keys, hierarchical path segments, timestamps, sizes, storage properties, tags or labels, access control attributes, and/or other non-payload indicators. In at least one embodiment, system 110 obtains metadata 145*a*, 145*b* via one or more provider APIs, inventory interfaces, event interfaces, or other metadata-access mechanisms that do not require reading file contents or other payload content.

In at least one embodiment, system 110 is further configured to analyze the obtained metadata to classify data objects and to generate one or more metadata-based data findings. For example, system 110 may cluster data objects based on similarity of metadata-derived features (e.g., path prefixes, hierarchical depth, tokenized names, timestamps, sizes, access control attributes) and may generate a classification for a group or cluster of data objects based on aggregated metadata associated with the group. System 110 may further associate a generated data finding with an object identifier of a respective data object (e.g., a file path or object key) to enable file-level aggregation of multiple data findings associated with the data object. In at least one embodiment, system 110 stores classifications, findings, object identifiers, file-level finding sets, confidence values, and/or status values in security database 120 for reporting, auditing, historical tracking, and/or downstream control application.

In at least one embodiment, system 110 supports an optional content scan when permitted. The optional content scan may be performed for a subset of data objects selected based on metadata-derived outputs, such that payload access is selectively invoked for confirmation and/or refinement rather than universally applied across all data objects. In at least one embodiment, the optional content scan includes obtaining a sample of payload content from a data object to generate one or more sample-based data findings associated with the data object. System 110 may aggregate the metadata-based data finding(s) and the sample-based data finding (s) into a file-level finding set for the data object and may apply a compounded cybersecurity control based on a combination of data findings within the file-level finding set. In at least one embodiment, results of the optional content scan, the file-level finding set, and the compounded control decision are stored in security database 120.

In at least one embodiment, computing environment 125 is a set of computing resources in which data objects may be stored and accessed, including public cloud infrastructure, private cloud infrastructure, on-premises infrastructure, edge resources, or combinations thereof. In at least one embodiment, computing environment 125 corresponds to a customer cloud computing environment including one or more cloud accounts, projects, subscriptions, tenants, regions, networks, or resource groups in which data objects are stored. Bucket 130 may include an object store or other storage service configured to store a plurality of data objects 135*a*. Database 140 may include a managed database service and/or database system configured to store a plurality of data objects 135*b*, such as tables, files, exports, snapshots, backups, logs, or other database-associated artifacts.

In at least one embodiment, inspection environment 105 is a computing environment in which system 110 performs analysis, classification, and/or control selection, and in which findings, rules, and related outputs may be stored. In at least one embodiment, inspection environment 105 is a cloud computing environment (distinct from computing environment 125) (not shown). The cloud computing environment may be implemented using public cloud infrastructure, private cloud infrastructure, on-premises computing resources, edge computing resources, or combinations thereof. The cloud computing environment may include, for example, a cloud provider environment (e.g., Google® Cloud Platform [GCP] environment) or similar platforms.

In at least one embodiment, communications between computing environment 125 and inspection environment 105 include transmission of metadata (no payload content), as illustrated by the metadata flow via network or communication infrastructure 150. By limiting communications to metadata, system 110 may reduce exposure to sensitive data contents while enabling environment-specific classification and dataset-level understanding based on metadata and hierarchy signals.

In at least one embodiment, remediation engine 115 is configured to receive one or more data findings, including a file-level finding set and/or a compounded control decision, and to initiate one or more remediation actions in response. Example remediation actions include, without limitation, modifying access control settings, applying encryption or storage configuration changes, tagging or labeling data objects, quarantining or relocating data objects, generating alerts or tickets, and/or initiating automated workflows in computing environment 125. Remediation engine 115 may obtain policies, control mappings, and/or historical remediation information from security database 120, and may record remediation status and results in security database 120. In at least one or more embodiments, remediation engine 115 may include (or is) one or more policy evaluation components and one or more automation components configured to select and initiate remediation actions via one or more provider interfaces.

In at least one embodiment, security database 120 is a repository configured to store findings, classifications, file-level finding sets, compounded control decisions, remediation outcomes, timestamps, status values, and other security-related outputs. The security database 120 may be implemented using one or more databases, key-value stores, indexes, file systems, or other data storage mechanisms. The security database 120 may be realized using any suitable storage architecture. In at least one embodiment, the security database 120 is implemented as cloud-based storage, including object-storage services, managed database services, distributed file systems, or virtualized storage volumes provided by a cloud infrastructure.

Network or communication infrastructure 150 provides communication pathways that enable data exchange between computing environment 125 and inspection environment 105. Communication infrastructure 150 may include one or more networks, buses, gateways, communication links, or interconnects, and may support distributed, remote, or cross-cloud deployment of the illustrated components. The illustrated connections represent logical associations and are not intended to limit physical deployment configurations.

It will be appreciated that the diagram of FIG. 1 is provided for purposes of illustration and is not intended to limit the disclosed embodiments to the specific architecture, arrangement of components, or configuration shown therein. Additionally, fewer or alternative components may be included, and the illustrated components may be combined, separated, or implemented in different forms without departing from the scope of the present disclosure. Additionally, the illustrated components may represent logical associations rather than physical network links, and the functionality described with respect to each component may be distributed across multiple computing resources.

Figure 2:
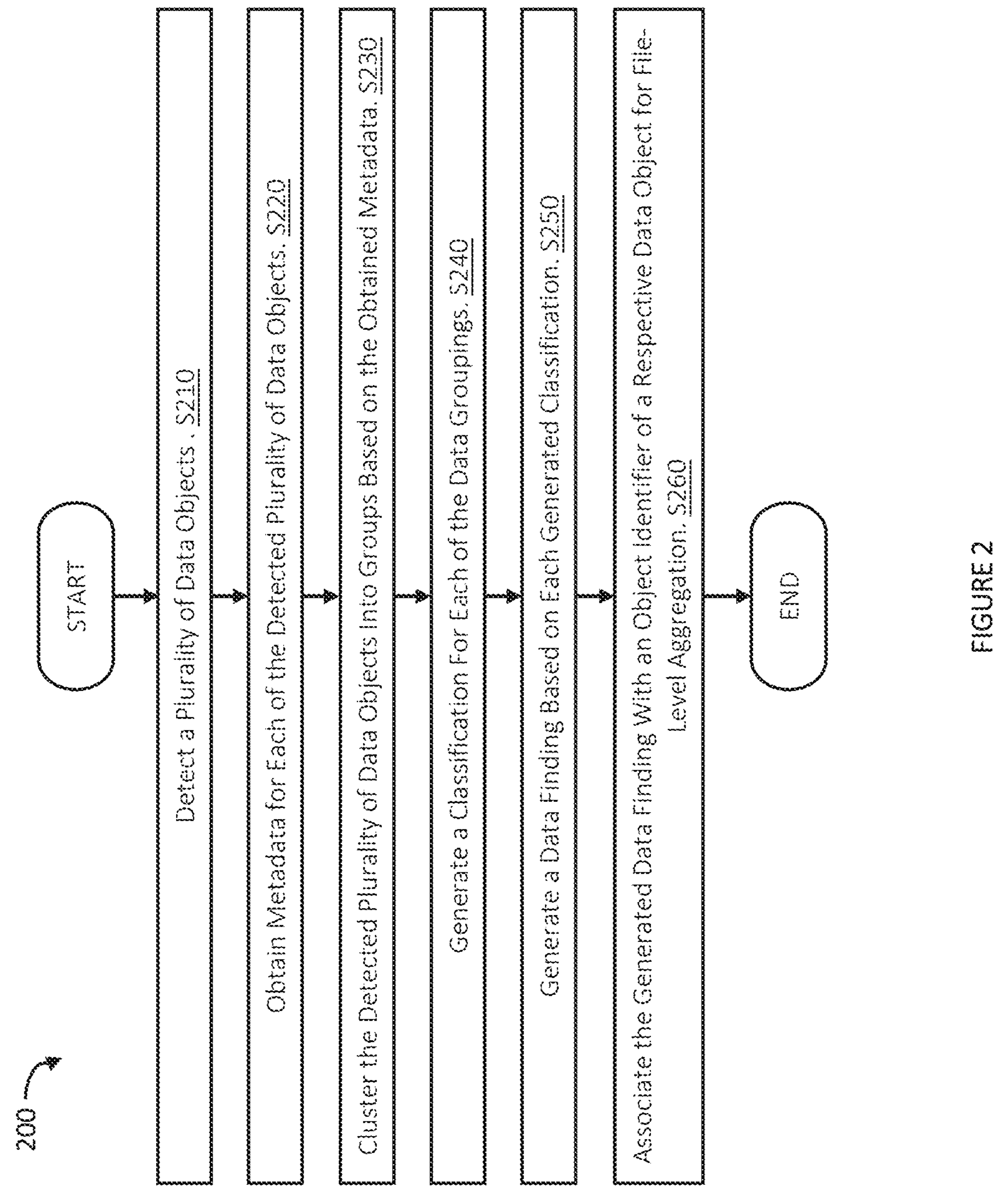
FIG. 2 illustrates an example operational flowchart of a process for classifying data objects based on metadata, according to at least one embodiment.

FIG. 2 is an operational flowchart diagram illustrating a method 200 (also referred to as "process 200") for classifying data objects based on metadata in a cloud computing environment, for generating one or more data findings based on the metadata-based classification, and for associating the generated data findings with object identifiers for file-level aggregation, according to at least one embodiment. In at least one embodiment, the method 200 may be performed by a system, such as the data security posture management (DSPM) system 110 shown in FIGS. 1 and 4. The method 200 is discussed with reference to the elements shown in FIG. 1.

At S210, a plurality of data objects is detected. In at least one embodiment, detecting the plurality of data objects includes discovering, enumerating, or otherwise identifying data objects stored in one or more data sources within a computing environment (e.g., computing environment 125), such as a bucket 130 and/or a database 140. The detected data objects may include, without limitation, files, blobs, objects, tables, exports, snapshots, backups, log artifacts, model artifacts, configuration artifacts, or other stored units addressable by a cloud provider interface. In at least one embodiment, system 110 detects the data objects across multiple cloud platforms, multiple accounts, multiple regions, and/or multiple data repositories associated with a customer environment (e.g., computing environment 125).

At S220, metadata is obtained for each of the detected plurality of data objects. In at least one embodiment, the metadata is obtained via one or more provider interfaces (e.g., APIs, inventory listings, catalog services, metadata endpoints, event streams, file system interfaces) configured to return object properties without returning payload content of the data objects. In at least one embodiment, obtaining metadata includes extracting the metadata from one or more provider interfaces without accessing payload content. The obtained metadata may include, by way of example and not limitation, object identifiers, names, file paths or object keys, hierarchical path segments, directory depth, timestamps, size, storage properties, tags or labels, ownership attributes, access control attributes, encryption indicators, versioning indicators, content-type indicators, and/or other non-payload properties. In at least one embodiment, system 110 normalizes the obtained metadata into a common representation for use across heterogeneous sources.

At S230, the detected plurality of data objects are clustered into groups based on the obtained metadata. In at least one embodiment, clustering includes computing similarity between pairs of data objects and assigning the data objects to one or more data groupings (also referred to as "clusters") based on the similarity. Similarity may be determined using one or more metadata-derived features, such as shared file path prefixes, overlap of tokenized path segments, directory depth proximity, naming conventions, extension or suffix patterns, timestamp distributions, size distributions, storage location proximity, tag similarity, and/or access control similarity. In at least one embodiment, file paths or object keys are used as primary clustering signals, such that clusters correspond to groups of data objects associated with a common hierarchy region of a namespace or file path. In at least one embodiment, system 110 performs clustering in an incremental manner by updating cluster assignments as additional data objects are detected or metadata changes are observed.

At S240, a classification is generated for each of the data groupings. In at least one embodiment, system 110 generates, for a given cluster, an aggregated cluster representation based on metadata of data objects within the cluster, such as representative object identifiers, common path tokens, naming patterns, and summary statistics of one or more metadata fields. System 110 may process the aggregated cluster representation using one or more classification techniques to generate a cluster classification indicative of a data type, dataset role, sensitivity category, control category, or other characterization. In at least one embodiment, the classification techniques include processing a prompt or other model input using a language model (LM) to obtain the cluster classification.

At S250, a data finding is generated based on each generated classification. In at least one embodiment, a data finding includes an association between a classification and one or more data objects and/or a cluster, and may further include supporting evidence derived from metadata, a confidence score, a time of detection, and/or recommended controls. The data finding may identify affected locations (e.g., buckets, prefixes, databases, schemas), impacted objects, and/or an inferred dataset purpose. In at least one embodiment, the data finding is stored in a security database (e.g., security database 120) and is made available for reporting, alerting, and/or downstream control selection.

At S260, the generated data finding is associated with an object identifier of a respective data object for file-level aggregation. In at least one embodiment, associating the generated data finding includes storing, for the data finding, the object identifier as a correlation key and, in at least one embodiment, storing one or more additional attributes usable to correlate the data finding with additional data findings associated with the same data object, such as a data source identifier, an account or tenant identifier, a resource identifier (e.g., bucket identifier, database identifier), a version identifier, and/or a timestamp. In at least one embodiment, the object identifier includes at least one of a file path, an object key, a URI, or other identifier that uniquely identifies the data object within a data source. In at least one embodiment, system 110 correlates multiple data findings to the same data object by joining data findings that share a common identifier (and, when applicable, a common data source identifier and/or tenant identifier), thereby enabling generation of a file-level finding set for the data object, as described herein.

Although FIG. 2 shows example blocks of the method 200, in some implementations, process 200 may include additional blocks, fewer blocks, different blocks, or differently arranged blocks than those depicted in FIG. 2. Additionally, or alternatively, two or more of the blocks of process 200 may be performed in parallel. For example, obtaining metadata at S220 may be performed concurrently for data objects across different sources, clustering at S230 may be performed continuously or periodically, classification at S240 may be performed for newly formed or updated clusters while other clusters remain unchanged, and association at S260 may be performed as part of finding generation or as a separate correlation step.

Figure 3:
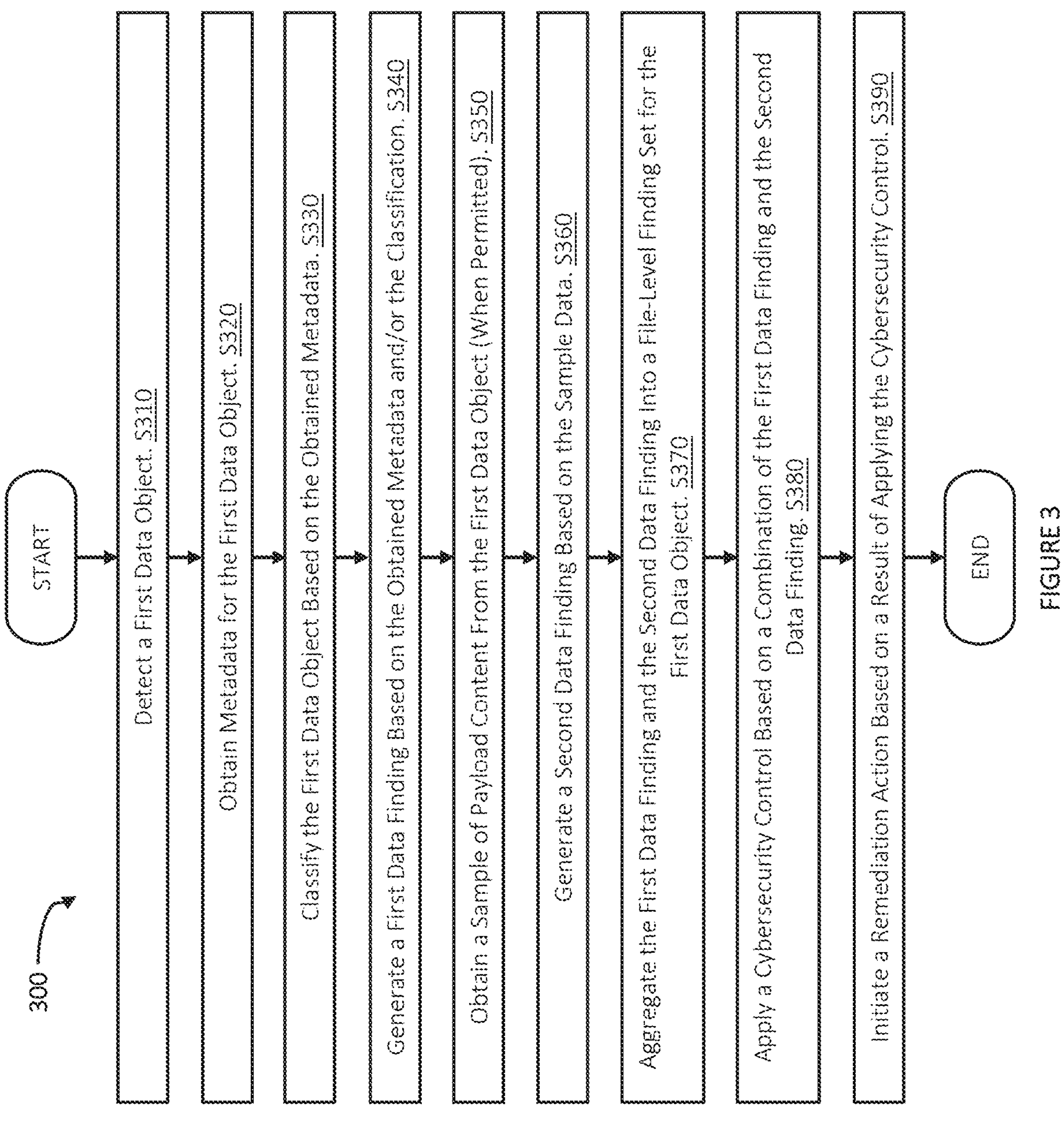
FIG. 3 illustrates an example operational flowchart of a process for generating multiple data findings associated with an individual data object, aggregating the multiple data findings into a file-level finding set, and initiating remediation actions based on a compounded cybersecurity control decision, according to at least one embodiment.

FIG. 3 is an operational flowchart diagram illustrating a method 300 (also referred to as "process 300") for generating multiple data findings associated with an individual data object, aggregating the multiple data findings into a file-level finding set, and initiating remediation actions based on a compounded cybersecurity control decision derived from a combination of the multiple data findings, according to at least one embodiment. In at least one embodiment, the method 300 may be performed by a system, such as the data security posture management (DSPM) system 110 and/or remediation engine 115 shown in FIGS. 1 and 4. The method 300 is discussed with reference to the elements shown in FIGS. 1 and 2.

At S310, a first data object is detected. In at least one embodiment, detecting the first data object includes discovering, enumerating, or otherwise identifying the first data object in a cloud computing environment (e.g., computing environment 125) and obtaining an object identifier associated with the first data object, such as a file path, object key, URI, or other identifier usable to locate the first data object within a data source.

At S320, metadata is obtained for the first data object. In at least one embodiment, the metadata is obtained via one or more provider interfaces configured to return object properties without returning payload content. In at least one embodiment, obtaining metadata includes extracting the metadata from one or more provider interfaces without accessing payload content.

At S330, the first data object is classified based on the obtained metadata. In at least one embodiment, classifying the first data object includes applying one or more classification techniques to metadata-derived features, and may include associating the first data object with one or more data groupings, clusters, labels, or categories based on the obtained metadata.

At S340, a first data finding is generated based on the obtained metadata and/or a result of classifying the first data object. In at least one embodiment, the first data finding identifies at least one sensitive data type, category, or policy-relevant characteristic inferred from metadata associated with the first data object and is associated with an object identifier of the first data object to enable file-level aggregation.

At S350, a sample of payload content is obtained from the first data object when permitted. In at least one embodiment, obtaining the sample includes selectively reading a portion of the payload content based on the first data object being selected as a candidate for content scanning, such that payload access is limited relative to full content scanning of a plurality of data objects. In at least one embodiment, obtaining the sample of payload content includes obtaining less than all the payload content of the first data object by reading at least one of a bounded number of bytes, a bounded number of records, and a bounded number of lines. In at least one embodiment, selecting the first data object for obtaining the sample of payload content is based on at least one of the first data finding, a confidence value associated with the first data finding, and a policy constraint.

At S360, a second data finding is generated based on the sample of payload content. In at least one embodiment, generating the second data finding includes applying one or more content-based detection techniques to the sample to detect one or more sensitive data types, identifiers, or patterns present in the first data object, and associating the second data finding with the object identifier of the first data object.

At S370, the first data finding and the second data finding are aggregated into a file-level finding set for the first data object. In at least one embodiment, aggregating includes correlating the first data finding and the second data finding using the object identifier of the first data object and generating a combined representation indicating multiple sensitive data types and corresponding counts associated with the first data object. In at least one embodiment, aggregating includes generating, for the first data object, a plurality of detected sensitive data types and a respective count for each sensitive data type.

At S380, a cybersecurity control is applied based on a combination of the first data finding and the second data finding. In at least one embodiment, applying the cybersecurity control includes determining a compounded control decision by evaluating the file-level finding set against one or more control policies, mappings, or thresholds that specify control actions conditioned on the co-occurrence of multiple sensitive data types within a same data object. For example, system 110 may determine a compounded classification, compounded sensitivity, or compounded severity based on the co-occurrence of multiple sensitive data types and/or counts associated with the respective sensitive data types within the file-level finding set, and may select one or more control actions based on the compounded classification, compounded sensitivity, or compounded severity. In at least one embodiment, determining the compounded sensitivity output includes applying at least one mapping or threshold to at least one of the co-occurrence of at least two sensitive data types in the file-level finding set and counts associated with the at least two sensitive data types. In at least one embodiment, the selected control action includes one or more of restricting access to the first data object, modifying permissions or access control lists, applying or enforcing encryption settings, applying tags or labels, modifying retention or storage configuration, quarantining or relocating the first data object, generating an alert or ticket, or initiating an automated workflow. In at least one embodiment, the cybersecurity control is applied to the first data object and/or to a location containing the first data object (e.g., a bucket, prefix, database, schema) via one or more provider interfaces, and the compounded control decision and selected action(s) are stored in security database 120.

At S390, a remediation action is initiated based on a result of applying the cybersecurity control. In at least one embodiment, remediation engine 115 initiates the remediation action. In at least one embodiment, initiating the remediation action includes invoking one or more provider interfaces to modify at least one of access controls, encryption settings, tags, or storage configuration associated with the first data object and/or a location containing the first data object. Remediation engine 115 may record remediation execution status, outcomes, and/or timestamps in security database 120, thereby enabling tracking of remediation progress over time.

Figure 5:
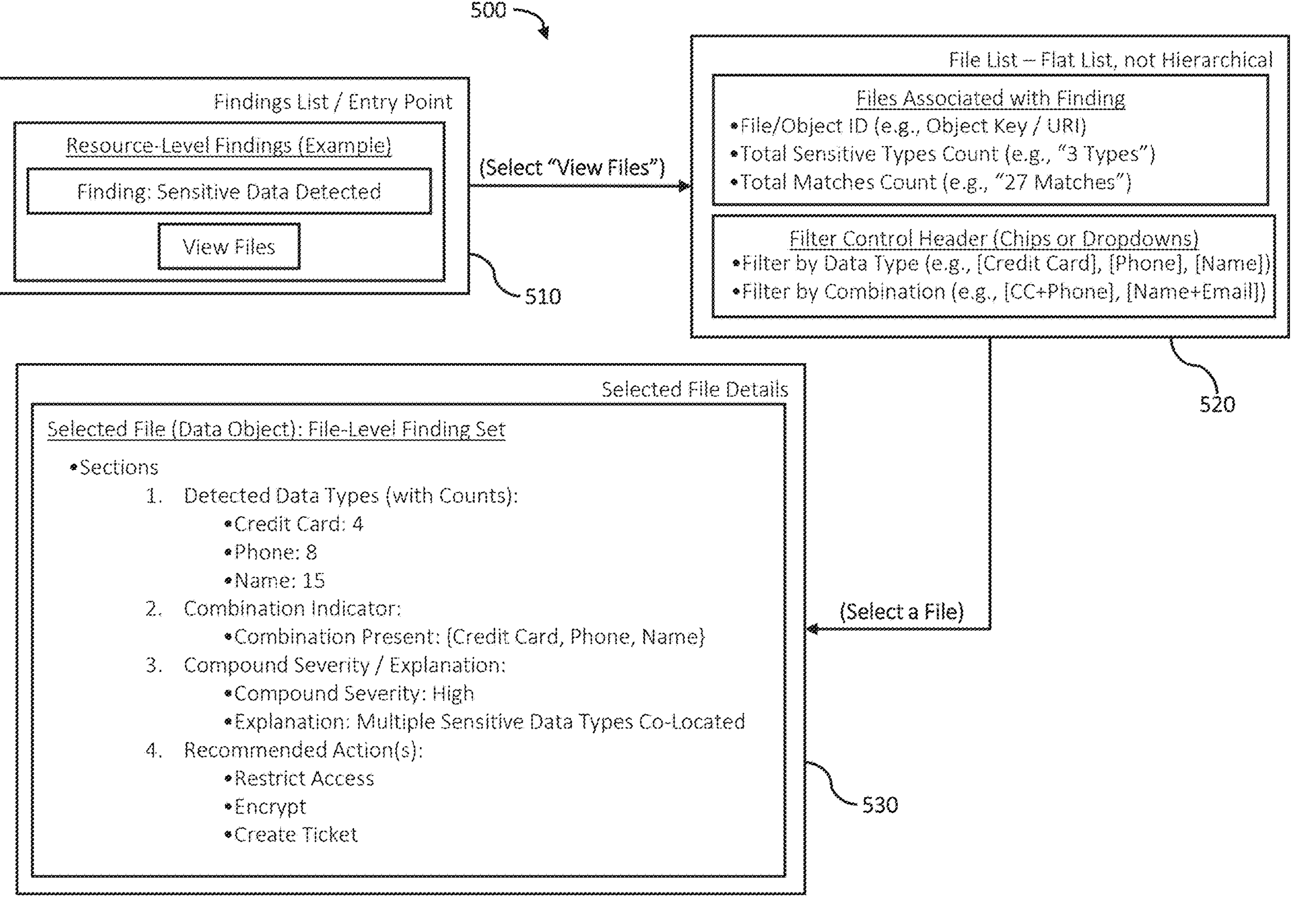
FIG. 5 illustrates an example user interface presentation for displaying a file-level finding set associated with an individual data object and enabling filtering and review of multiple data findings associated with the individual data object, according to at least one embodiment.

In at least one embodiment, at least one of the file-level finding set, the compounded sensitivity output, and the compounded cybersecurity control decision are stored in security database 120. Moreover, in at least one embodiment, a serialized export of at least one of the stored items is generated, as shown in FIG. 5.

Although FIG. 3 shows example blocks of the method 300, in some implementations, process 300 may include additional blocks, fewer blocks, different blocks, or differently arranged blocks than those depicted in FIG. 3. Additionally, or alternatively, two or more of the blocks of process 300 may be performed in parallel. For example, a plurality of data findings may be generated for the first data object from multiple metadata-based techniques and/or multiple content-based techniques, multiple data objects may be processed concurrently, and remediation actions may be staged such that a first action (e.g., tagging) precedes a second action (e.g., permission modification) based on policy constraints, approval workflows, or operational safety requirements.

Figure 4:
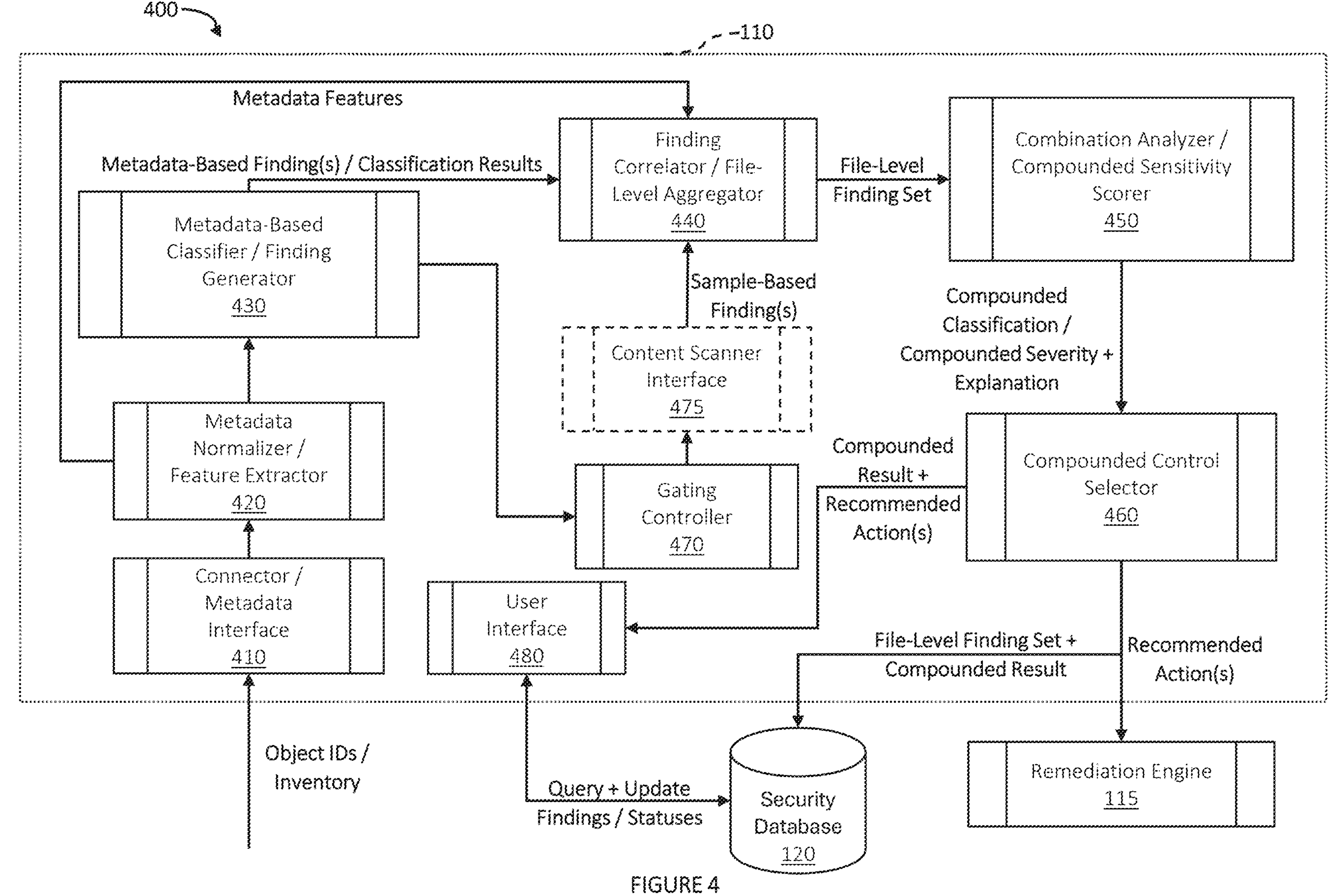
FIG. 4 illustrates an example functional diagram of a portion of the data security posture management (DSPM) system for generating metadata-based data findings and sample-based data findings, correlating the data findings to an individual data object to generate a file-level finding set, determining compounded sensitivity based on combinations of data findings, and selecting a compounded cybersecurity control and recommended actions, according to at least one embodiment.

FIG. 4 illustrates an example functional diagram 400 of a portion of the data security posture management (DSPM) system 110 according to at least one embodiment. As shown in FIG. 4, system 110 may be decomposed into a plurality of logical subcomponents that cooperate to obtain metadata associated with detected data objects, generate one or more metadata-based data findings, optionally obtain a sample of payload content when permitted to generate one or more sample-based data findings, correlate multiple data findings associated with a same data object into a file-level finding set, determine compounded sensitivity based on combinations of data findings within the file-level finding set, and select one or more cybersecurity controls and recommended actions based on the compounded sensitivity, as described herein. In the illustrated embodiment 400, the logical subcomponents include connector/metadata interface 410, metadata normalizer/feature extractor 420, metadata-based classifier/finding generator 430, finding correlator/file-level aggregator 440, combination analyzer/compounded sensitivity scorer 450, compounded control selector 460, gating controller 470, content scanner interface 475, and user interface 480. The components illustrated in FIG. 4 represent select functional modules of system 110, and their arrangement is provided for purposes of explanation rather than limitation.

In at least one embodiment, connector/metadata interface 410 is configured to obtain object identifiers and/or inventory information (e.g., object keys, URIs, table identifiers) for data objects stored in one or more data sources, and to obtain metadata for the data objects via one or more provider interfaces. Connector/metadata interface 410 may obtain metadata without obtaining the payload content of the data objects. The metadata may include, by way of example and not limitation, object identifiers, names, file paths or object keys, hierarchical path segments, timestamps, size, storage properties, tags or labels, access control attributes, encryption indicators, versioning indicators, and/or other non-payload properties. In at least one embodiment, connector/metadata interface 410 provides the obtained metadata to downstream modules of system 110 for feature generation, classification, and correlation of findings to individual data objects. In at least one embodiment, connector/metadata interface 410 includes (or is) one or more connector components and one or more analyzers configured to discover data objects in one or more data sources and to obtain metadata associated with the data objects via one or more provider interfaces without accessing payload content.

In at least one embodiment, metadata normalizer/feature extractor 420 is configured to transform raw metadata obtained by connector/metadata interface 410 into metadata-derived features usable for classification and correlation. For example, metadata normalizer/feature extractor 420 may normalize field formats across heterogeneous sources, tokenize names and path segments, derive hierarchy/path features (e.g., prefix, depth, token frequency), and compute additional metadata-derived attributes (e.g., timestamp distributions, size bins, tag vectors, access-control similarity indicators). Metadata normalizer/feature extractor 420 outputs metadata-derived features to a metadata-based classifier/finding generator 430. In at least one embodiment, metadata normalizer/feature extractor 420 includes (or is) one or more feature generation components and one or more analyzers configured to normalize metadata across heterogeneous sources, tokenize names and path segments, and generate metadata-derived features, including hierarchy and path features.

In at least one embodiment, system 110 derives hierarchy and path features from object identifiers (e.g., file paths and/or object keys) obtained for data objects. For example, system 110 may parse an object key or file path into segments using delimiters, determine a depth within a namespace, and determine one or more tokens, such as path segments, filename substrings, and extensions. Such hierarchy and path features may be used, alone or in combination with other metadata (e.g., timestamps, size, tags, access control attributes), to generate metadata-derived features used for metadata-based classification and generation of metadata-based data findings without accessing payload content. In at least one embodiment, the object identifiers and derived hierarchy/path features are further used to associate metadata-based data findings with a respective data object for aggregation into a file-level finding set, as described herein.

In at least one embodiment, metadata-based classifier/finding generator 430 is configured to classify data objects based on metadata and to generate one or more metadata-based data findings. In at least one embodiment, metadata-based classifier/finding generator 430 generates classification results and associated findings for data objects and associates such outputs with an object identifier of a respective data object (e.g., file path or object key). The metadata-based data findings may include, by way of example and not limitation, a detected sensitive data type, a category, a confidence score, evidence derived from metadata, and one or more counts or summary attributes. In at least one embodiment, metadata-based classifier/finding generator 430 includes (or is) one or more classification components and one or more analyzers configured to generate classification results and metadata-based data findings for data objects without accessing payload content.

In at least one embodiment, the metadata-based classifications and metadata-based data findings generated by metadata-based classifier/finding generator 430 are produced using one or more rules, models, or combinations thereof that are configurable and environment-specific. For example, system 110 may maintain one or more rule definitions, classifier configurations, and/or validation metrics, and may update such rules or configurations over time as additional metadata is obtained from a customer environment (e.g., computing environment 125 [FIG. 1]) and as observed metadata patterns change. In at least one embodiment, system 110 applies such rules or configurations to newly detected or changed data objects to generate updated metadata-based data findings associated with individual data objects, which may be correlated and aggregated into file-level finding sets, as described herein.

In at least one embodiment, finding correlator/file-level aggregator 440 is configured to correlate multiple data findings associated with a same data object and to generate a file-level finding set for the data object. In at least one embodiment, finding correlator/file-level aggregator 440 correlates data findings using an object identifier (e.g., file path, object key, URI) and aggregates, for a single data object, multiple detected sensitive data types and associated counts, thereby enabling analysis of combinations of findings within the same data object. In at least one embodiment, finding correlator/file-level aggregator 440 includes (or is) one or more correlation components and one or more analyzers configured to join and aggregate data findings from multiple sources using the object identifier of the data object.

In at least one embodiment, gating controller 470 is configured to select a candidate subset of data objects for optional content scanning when permitted. In at least one embodiment, gating controller 470 selects the candidate subset based on metadata-derived outputs (e.g., classification results, metadata-based findings, confidence values, policy constraints) such that payload access is selectively invoked. Gating controller 470 may output the candidate subset to content scanner interface 475. In at least one embodiment, gating controller 470 includes (or is) one or more selection components and one or more analyzers configured to select a candidate subset of data objects for optional content scanning based on metadata-derived outputs, confidence values, and policy constraints.

In at least one embodiment, content scanner interface 475 is configured to obtain a sample of payload content from a data object in the candidate subset when permitted and to generate one or more sample-based data findings based on the sample. The sample-based data findings may indicate the detection of one or more sensitive data types, identifiers, or patterns present within the data object. In at least one embodiment, content scanner interface 475 provides the sample-based data findings to finding correlator/file-level aggregator 440 for aggregation with metadata-based data findings associated with the same data object. In at least one embodiment, content scanner interface 475 includes (or is) one or more scanning components and one or more analyzers configured to perform payload-based inspection on the candidate subset using pattern recognition or other scanning techniques when permitted and to output sample-based data findings usable to refine classifications and findings.

In at least one embodiment, combination analyzer/compounded sensitivity scorer 450 is configured to analyze a file-level finding set and determine compounded sensitivity based on combinations of multiple data findings within a same data object. For example, combination analyzer/compounded sensitivity scorer 450 may determine the co-occurrence of multiple sensitive data types within the file-level finding set and may generate a compounded severity, compounded sensitivity score, and/or a compounded classification indicative of increased sensitivity due to the combination. In at least one embodiment, combination analyzer/compounded sensitivity scorer 450 includes (or is) one or more analysis components and one or more analyzers configured to determine combinations of data findings and to generate compounded sensitivity outputs based on the combinations.

In at least one embodiment, compounded control selector 460 is configured to select, determine, and/or recommend one or more cybersecurity controls based on the compounded sensitivity outputs generated by combination analyzer/compounded sensitivity scorer 450. In at least one embodiment, compounded control selector 460 applies one or more policy constraints, control mappings, and/or thresholds to determine a compounded control decision that is conditioned on a combination of data findings within a file-level finding set. The compounded control decision may include recommended actions and/or executable actions, such as restricting access, applying encryption settings, tagging objects, quarantining objects, generating alerts, and/or initiating workflows. In at least one embodiment, compounded control selector 460 provides recommended action(s) to remediation engine 115 for initiation in the computing environment 125 (FIG. 1), and the compounded control decision and/or recommended actions may be stored in security database 120. In at least one embodiment, compounded control selector 460 includes (or is) one or more control selection components and one or more analyzers configured to map file-level finding sets and compounded sensitivity outputs to one or more recommended actions, policies, or remediation workflows based on control mappings and policy constraints.

In at least one embodiment, user interface 480 is configured to present file-level finding sets for data objects and to support filtering and review of multiple data findings associated with individual data objects. For example, user interface 480 may provide a file-level view of data objects associated with a resource-level finding, display multiple sensitive data types detected within a selected data object, display counts associated with respective data types, and display an indicator of a combination of data types detected within the selected data object. In at least one embodiment, user interface 480 receives a compounded result and recommended action(s) from compounded control selector 460 for presentation and queries and updates findings and statuses stored in security database 120. In at least one embodiment, user interface 480 includes (or is) one or more presentation components and one or more analyzers configured to generate and render user interface views based on file-level finding sets and compounded sensitivity outputs.

It will be appreciated that the functional arrangement illustrated in FIG. 4 is exemplary and that additional, fewer, or alternative functional engines or modules may be included within system 110 without departing from the scope of the disclosed embodiments herein. The illustrated connections may represent logical data flows rather than physical connections, and the described functionality may be distributed across multiple computing resources or combined into a single module, depending on implementation requirements.

It should be noted that system 110 and any of its modules 410, 420, 430, 440, 450, 460, 470, 475, and 480 may be implemented as software, hardware, or a combination thereof. In at least one embodiment, system 110 may be realized as just-in-time compiled software code. As used herein, the term "software" refers to one or more sequences of instructions, logic, or routines, including, but not limited to, source code, object code, intermediate code, interpretable code, or executable code, that may be stored on a non-transitory computer-readable medium and executed by one or more processors. The software may be implemented using one or more machine learning frameworks, including, but not limited to, TensorFlow™, PyTorch™, ONNX™, or equivalent platforms. The software may be executed in virtualized environments, such as containers, virtual machines, or serverless architectures, or may be deployed via cloud infrastructure.

Figure 6:
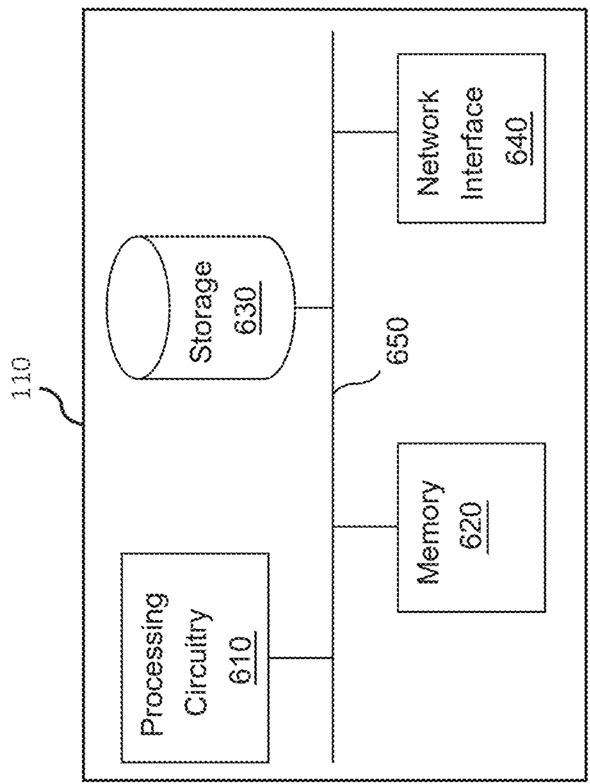
FIG. 6 illustrates an example block diagram of a computing architecture of a DSPM system, according to at least one embodiment.

In at least one embodiment, the system 110 is executed on a hardware layer (not shown in FIG. 4). The term "hardware" refers to one or more physical computing devices or components capable of performing operations, including model training, inference, and/or data processing. Non-limiting examples of hardware include central processing units (CPUs), graphics processing units (GPUs), tensor processing units (TPUs), application-specific integrated circuits (ASICs), field programmable gate arrays (FPGAs), neural processing units (NPUs), or equivalent dedicated AI accelerators, on-device microcontrollers, or edge processors capable of running trained models, and the like. The described embodiments are not limited to any particular implementation platform and may be deployed across heterogeneous environments comprising combinations of the above. An example hardware layer implementation of the system 110 in hardware is shown in FIG. 6.

FIG. 5 illustrates an example user interface presentation 500 for displaying a file-level finding set associated with an individual data object and for enabling review and filtering of multiple data findings associated with the individual data object, according to at least one embodiment.

In at least one embodiment, user interface presentation 500 includes a resource-level findings view 510 that presents one or more findings associated with a resource (e.g., a bucket or other data source) and provides a control for accessing a file-level view (e.g., "View Files") corresponding to the resource-level finding.

In at least one embodiment, user interface presentation 500 includes a file list view 520 that presents a flat list of data objects associated with a selected resource-level finding. The file list view 520 may display, for each data object, an object identifier (e.g., file path, object key, or URI), a total number of detected sensitive data types, and a total count of detected sensitive elements or matches.

In at least one embodiment, user interface presentation 500 includes one or more filter controls configured to filter the file list view 520 and/or file-level detail view 530 by at least one of: (i) a selected sensitive data type; (ii) a selected combination of sensitive data types; (iii) a confidence threshold; or (iv) another policy-relevant attribute of the file-level finding set.

In at least one embodiment, user interface presentation 500 includes a file-level detail view 530 corresponding to a selected data object. The file-level detail view 530 may present the file-level finding set for the selected data object, including a list of sensitive data types detected within the selected data object and counts associated with respective sensitive data types.

In at least one embodiment, the file-level detail view 530 presents a combination indicator indicating the co-occurrence of at least two sensitive data types within the selected data object and, in at least one embodiment, presents a compounded sensitivity indicator (e.g., severity tier, compounded sensitivity score, or compounded classification) derived from the combination of data findings within the file-level finding set.

In at least one embodiment, user interface presentation 500 presents one or more recommended actions determined based on the compounded sensitivity indicator, including one or more actions selectable for initiation in a computing environment (e.g., computing environment 125 [FIG. 1]), and may further provide an export control configured to output a serialized representation of the file-level finding set and associated compounded sensitivity outputs (e.g., JSON).

It will be appreciated that the user interface presentation 500 illustrated in FIG. 5 is provided for purposes of illustration and is not intended to limit the disclosed embodiments to the specific layout, controls, labels, or presentation arrangement shown therein. In at least one implementation, the presentation may include additional views, fewer views, different views, or differently arranged views, and one or more of the illustrated controls may be combined, separated, or replaced without departing from the scope of the present disclosure.

FIG. 6 is an example block diagram of a computing architecture of the data security posture management (DSPM) system 110.

The DSPM system 110 includes a processing circuitry 610 coupled to a memory 620, a storage 630, and a network interface 640. In an embodiment, the components may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

In at least some embodiments, the processing circuitry 610 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 710 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like. In at least one embodiment, such models include language models used to generate classifications from prompts or other model inputs derived from metadata and/or aggregated representations, as described herein.

In embodiments that utilize language models (LMs) or otherwise perform operations that may require or be enhanced through the use of parallel processing, the processing circuitry 610 may include processors such as CPUs, GPUs, TPUs, or other specialized accelerators capable of supporting large-scale inference and training. The hardware resources may be deployed on-premises, in a cloud-computing environment, or in a hybrid configuration, and may include memory, storage, and networking components sufficient to support parallel execution, load balancing, and scalable processing of genAI workloads.

The memory 620 may be volatile (e.g., RAM, etc.), non-volatile (e.g., ROM, flash memory, etc.), or any combination thereof. In one configuration, computer-readable instructions needed to implement one or more embodiments disclosed herein may be stored in the storage 630.

In another embodiment, the memory 620 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 610 to perform the various processes described herein.

The storage 630 may be magnetic storage, optical storage, solid-state storage, or other non-transitory computer-readable storage media, and may be realized, for example, as flash memory or other memory technology, CD-ROM, Digital Versatile Disks (DVDs), hard disk drives, solid state drives (SSDs), or any other medium that may be used to store information. Storage 630 may include instructions (i.e., code) for executing the operations described herein, including, without limitation, detecting data objects in one or more cloud computing environments, obtaining and normalizing metadata associated with the data objects without accessing payload content, generating metadata-derived features, generating one or more metadata-based data finings associated with individual data objects, optionally obtaining samples of payload content when permitted to generate one or more sample-based data findings, aggregating multiple data findings associated with a same data object into a file-level finding set, determining compounded sensitivity based on combinations of data findings within the file-level finding set, selecting and outputting one or more recommended actions based on a compounded control decision, presenting file-level finding sets via a user interface, and initiating or recommending remediation actions. Storage 630 may further store file-level finding sets, compounded sensitivity outputs, compounded control decisions, configuration data, policy mappings, findings (including timestamps and status), and/or intermediate and/or output data generated by the DSPM system 110.

The network interface 640 allows the DSPM system 110 to communicate over one or more networks, such as the Internet or a local area network (LAN). The network interface 640 communicates with these elements. The network interface 640 may further support communication with one or more data sources and cloud services in a customer computing environment (e.g., computing environment 125 [FIG. 1]) including, for example, object storage services (e.g., bucket 130 [FIG. 1]), databases (e.g., database 140 [FIG. 1]), inventory and catalog services, event notification services, and other provider APIs by which metadata may be obtained without obtaining payload content. The network interface 640 may further support communication with an inspection environment (e.g., inspection environment 105 [FIG. 1]), including security database 120 (FIG. 1) and remediation engine 115 (FIG. 1), and may support communication with external services, cloud-based platforms, and network-accessible APIs used for optional content scanning when permitted and/or for initiating remediation actions. In at least one embodiment, the network interface 640 supports wired and/or wireless communication protocols, including, without limitation, Ethernet, Wi-Fi, cellular, TCP/IP, HTTP/HTTPS, WebSocket, gRPC, and/or other suitable communication protocols, and may facilitate secure communication using authentication, encryption, and/or authorization mechanisms.

It should be understood that the embodiments described herein are not limited to the specific architecture illustrated in FIG. 6 and that other architectures may be equally used without departing from the scope of the disclosed embodiments.

It should be further noted that the DSPM system 110 may be realized using a computing architecture similar to the architecture illustrated in FIG. 6, but that other architectures may be equally used without departing from the scope of the disclosed embodiments. Further, the memory 620 may include instructions for executing the function of the respective device.

The various embodiments disclosed herein can be implemented as hardware, firmware, firmware executing on hardware, software, software executing on hardware, or any combination thereof. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a micro-instruction code. The various processes and functions described herein may be either part of the micro-instruction code or part of the application program, or any combination thereof, which may be executed by a CPU, whether or not such computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the groups consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for applying compounded cybersecurity controls in a data security posture management (DSPM) system based on data findings associated with an individual data object in a cloud computing environment, comprising:

detecting a plurality of data objects in one or more data sources of the cloud computing environment, wherein the plurality of data objects includes a first data object;

obtaining metadata for the first data object via one or more provider interfaces without accessing payload content of the first data object;

generating a first data finding for the first data object based on the obtained metadata;

associating the first data finding with an object identifier of the first data object;

obtaining a sample of the payload content from the first data object when permitted;

generating a second data finding for the first data object based on analysis of the obtained sample of payload content;

associating the second data finding with the object identifier of the first data object;

aggregating the first data finding and the second data finding into a file-level finding set for the first data object based on the object identifier;

determining a compounded sensitivity output based on a combination of the first data finding and the second data finding within the file-level finding set;

determining a compounded cybersecurity control decision based on the compounded sensitivity output and at least one of control policies and mappings; and initiating a remediation action in the cloud computing environment based on the compounded cybersecurity control decision.

2. The method of claim 1, further comprising:

determining a combination indicator indicating co-occurrence of at least two sensitive data types within the file-level finding set.

3. The method of claim 1, wherein obtaining metadata further comprises:

extracting the metadata from the one or more provider interfaces without reading file contents or other payload content of the first data object.

4. The method of claim 1, further comprising:

selecting the first data object for obtaining the sample of payload content based on at least one of the first data finding, a confidence value associated with the first data finding, and a policy constraint.

5. The method of claim 1, wherein obtaining the sample of payload content further comprises:

obtaining less than all payload content of the first data object by reading at least one of a bounded number of bytes, a bounded number of records, and a bounded number of lines.

6. The method of claim 1, wherein aggregating the first data finding and the second data finding into the file-level finding set further comprises:

generating, for the first data object, a plurality of detected sensitive data types and a respective count for each sensitive data type.

7. The method of claim 1, wherein determining the compounded sensitivity output further comprises:

applying at least one mapping or threshold to at least one of co-occurrence of at least two sensitive data types in the file-level finding set and counts associated with the at least two sensitive data types.

8. The method of claim 1, wherein initiating the remediation action further comprises:

invoking the one or more provider interfaces to modify at least one of access controls, encryption settings, tags, and storage configuration associated with the first data object or a location containing the first data object.

9. The method of claim 1, further comprising:

storing, in a security database, at least one of the file-level finding set, the compounded sensitivity output, and the compounded cybersecurity control decision; and generating a serialized export of at least one of the stored file-level finding set, compounded sensitivity output, and compounded cybersecurity control decision.

10. A system for applying compounded cybersecurity controls in a data security posture management (DSPM) system based on data findings associated with an individual data object in a cloud computing environment comprising:

a processing circuitry:

a memory, the memory containing instructions that, when executed by the processing circuitry, configure the system to:

detect a plurality of data objects in one or more data sources of the cloud computing environment, wherein the plurality of data objects includes a first data object;

obtain metadata for the first data object via one or more provider interfaces without accessing payload content of the first data object;

generate a first data finding for the first data object based on the obtained metadata;

associate the first data finding with an object identifier of the first data object;

obtain a sample of the payload content from the first data object when permitted;

generate a second data finding for the first data object based on analysis of the obtained sample of payload content;

associate the second data finding with the object identifier of the first data object;

aggregate the first data finding and the second data finding into a file-level finding set for the first data object based on the object identifier;

determine a compounded sensitivity output based on a combination of the first data finding and the second data finding within the file-level finding set;

determine a compounded cybersecurity control decision based on the compounded sensitivity output and at least one of control policies and mappings; and initiate a remediation action in the cloud computing environment based on the compounded cybersecurity control decision.

11. The system of claim 10, wherein the memory contains further instructions which when executed by the processing circuitry further configure the system to:

determine a combination indicator indicating co-occurrence of at least two sensitive data types within the file-level finding set.

12. The system of claim 10, wherein the memory contains further instructions which when executed by the processing circuitry when obtaining metadata further configure the system to:

extract the metadata from the one or more provider interfaces without reading file contents or other payload content of the first data object.

13. The system of claim 10, wherein the memory contains further instructions which when executed by the processing circuitry further configure the system to:

select the first data object for obtaining the sample of payload content based on at least one of the first data finding, a confidence value associated with the first data finding, and a policy constraint.

14. The system of claim 10, wherein the memory contains further instructions which when executed by the processing circuitry when obtaining the sample of payload content further configure the system to:

obtain less than all payload content of the first data object by reading at least one of a bounded number of bytes, a bounded number of records, and a bounded number of lines.

15. The system of claim 10, wherein the memory contains further instructions which when executed by the processing circuitry when aggregating the first data finding and the second data finding into the file-level finding set further configure the system to:

generate, for the first data object, a plurality of detected sensitive data types and a respective count for each sensitive data type.

16. The system of claim 10, wherein the memory contains further instructions which when executed by the processing circuitry when determining the compounded sensitivity output further configure the system to:

apply at least one mapping or threshold to at least one of co-occurrence of at least two sensitive data types in the file-level finding set and counts associated with the at least two sensitive data types.

17. The system of claim 10, wherein the memory contains further instructions which when executed by the processing circuitry when initiating the remediation action, further configure the system to:

invoke the one or more provider interfaces to modify at least one of access controls, encryption settings, tags, and storage configuration associated with the first data object or a location containing the first data object.

18. The system of claim 10, wherein the memory contains further instructions which when executed by the processing circuitry further configure the system to:

store, in a security database, at least one of the file-level finding set, the compounded sensitivity output, and the compounded cybersecurity control decision; and generate a serialized export of at least one of the stored file-level finding set, compounded sensitivity output, and compounded cybersecurity control decision.

19. A non-transitory computer-readable medium storing a set of instructions for applying compounded cybersecurity controls in a data security posture management (DSPM) system based on data findings associated with an individual data object in a cloud computing environment, the set of instructions comprising:

one or more instructions that, when executed by one or more processing circuitries of a device, cause the device to:

detect a plurality of data objects in one or more data sources of the cloud computing environment, wherein the plurality of data objects includes a first data object;

obtain metadata for the first data object via one or more provider interfaces without accessing payload content of the first data object;

generate a first data finding for the first data object based on the obtained metadata;

associate the first data finding with an object identifier of the first data object;

obtain a sample of the payload content from the first data object when permitted;

generate a second data finding for the first data object based on analysis of the obtained sample of payload content;

associate the second data finding with the object identifier of the first data object;

aggregate the first data finding and the second data finding into a file-level finding set for the first data object based on the object identifier;

determine a compounded sensitivity output based on a combination of the first data finding and the second data finding within the file-level finding set;

determine a compounded cybersecurity control decision based on the compounded sensitivity output and at least one of control policies and mappings; and initiate a remediation action in the cloud computing environment based on the compounded cybersecurity control decision.

* * * * *